(12) United States Patent
Biriuk

(10) Patent No.: US 12,169,292 B2
(45) Date of Patent: Dec. 17, 2024

(54) DISPLAY FOR LASER PROJECTOR

(71) Applicant: Microavia International Limited, Dublin (IE)

(72) Inventor: Ivan Biriuk, Saint Petersburg (RU)

(73) Assignee: Microavia International Limited, Dublin (IE)

( * ) Notice: Subject to any disclaimer, the term of this patent is extended or adjusted under 35 U.S.C. 154(b) by 247 days.

(21) Appl. No.: 17/663,839

(22) Filed: May 18, 2022

(65) Prior Publication Data

US 2023/0375851 A1 Nov. 23, 2023

(51) Int. Cl.
| | |
|---|---|
| *G02B 30/56* | (2020.01) |
| *B64C 39/02* | (2023.01) |
| *B64D 1/18* | (2006.01) |
| *G05D 1/00* | (2006.01) |
| *B64U 10/13* | (2023.01) |
| *B64U 101/00* | (2023.01) |

(52) U.S. Cl.
CPC ............ *G02B 30/56* (2020.01); *B64C 39/024* (2013.01); *B64D 1/18* (2013.01); *G05D 1/104* (2013.01); *B64U 10/13* (2023.01); *B64U 2101/00* (2023.01)

(58) Field of Classification Search
None
See application file for complete search history.

(56) References Cited

U.S. PATENT DOCUMENTS

| | | | | |
|---|---|---|---|---|
| 9,555,883 B1 * | 1/2017 | Navot | ................... | G05D 1/0808 |
| 10,514,710 B2 * | 12/2019 | Pohl | ....................... | G05D 1/104 |
| 10,723,455 B1 * | 7/2020 | Hovey | ...................... | A63J 5/02 |
| 11,119,509 B2 * | 9/2021 | Arango | ................... | B64D 47/06 |
| 11,247,786 B2 * | 2/2022 | Kuhara | ................ | G05D 1/0033 |
| 11,314,245 B2 * | 4/2022 | Gurdan | ................ | G08G 5/0069 |
| 11,435,656 B1 * | 9/2022 | Nielsen | ................ | H04N 9/3185 |
| 11,481,997 B1 * | 10/2022 | Nielsen | ................... | B64D 47/02 |

(Continued)

FOREIGN PATENT DOCUMENTS

| | | |
|---|---|---|
| CN | 113064445 A | 7/2021 |
| KR | 102064239 B1 | 1/2020 |

(Continued)

OTHER PUBLICATIONS

Ippei Suzuki, Design Method for Gushed Light Field: Aerosol-Based Aerial and Instant Display, Mar. 2017, Researchgate, pp. 1-11 (Year: 2017).*

(Continued)

*Primary Examiner* — Justin S Lee
(74) *Attorney, Agent, or Firm* — ESPE Legal Consultancy FZ-LLC

(57) ABSTRACT

A system and a method for displaying a light show is disclosed herein. The system comprises a plurality of Unmanned Aerial Vehicles (UAVs) having a screening medium reservoir attached thereto. A Ground Control Station (GCS) is communicatively coupled to the plurality of UAVs, wherein the communication between the GCS and the plurality of UAVs is bidirectional communication, and wherein the GCS is configured to control the plurality of UAVs in accordance with at least one flight program. A light controller is communicatively coupled to the GCS and configured to control at least one light source in accordance with the at least one flight program.

20 Claims, 4 Drawing Sheets

(56) References Cited

U.S. PATENT DOCUMENTS

| | | | | |
|---|---|---|---|---|
| 2014/0236388 A1* | 8/2014 | Wong | ................. | G09G 5/02 |
| | | | | 244/17.23 |
| 2017/0221394 A1* | 8/2017 | Garcia Morchon | .... | G09F 19/18 |
| 2019/0219833 A1 | 7/2019 | Young | | |
| 2019/0315486 A1* | 10/2019 | Martin | ................. | B64D 47/06 |

FOREIGN PATENT DOCUMENTS

| | | |
|---|---|---|
| WO | WO2016015943 A1 | 2/2016 |
| WO | WO2017117296 A1 | 7/2017 |

OTHER PUBLICATIONS

European Search Report EP22020591, Oct. 9, 2023.

\* cited by examiner

Figure 2

DISPLAY FOR LASER PROJECTOR

FIELD OF THE INVENTION

The invention pertains to the field of unmanned aerial vehicles, and in particular the invention pertains to a system and method for displaying a light show using unmanned aerial vehicles.

BACKGROUND OF THE INVENTION

A light show or drone art is a visual performance usually involving a use of multiple unmanned aerial vehicles. Some usual methods of performing a light show include the use of large reflective screens, which are very difficult to quickly position and be retained in the desired position for a long time. Another disadvantageous aspect is that the light show pictures are flat and not three-dimensional. To this end, a three-dimensional panorama for laser and light projection have been developed in the art, which involves the use of machines like smoke or gas sprayers, but such screens can quickly dissolve in the air and can also be quickly blown away by the wind, which is not desired.

For a more contrasting and more vibrant light show, a heterogeneous screening medium is needed, which can be created and maintained in real time to withstand differing weather conditions, including the presence of wind in open spaces or air currents indoors.

As such, there is a need for a high-contrast volumetric screening medium for a light show that can maintain the necessary shape and lighting parameters throughout the entire show with minimal negative impact on the environment and human health.

SUMMARY OF THE INVENTION

The present disclosure envisages a system for displaying a light show. The system comprises a plurality of Unmanned Aerial Vehicles (UAVs) having a screening medium reservoir attached thereto. A Ground Control Station (GCS) is communicatively coupled to the plurality of UAVs, wherein the GCS is configured to control a flight of the plurality of UAVs in accordance with a flight program and discharge of a screening medium from the screening medium reservoir. A light controller is communicatively coupled to the GCS and configured to control at least one light source in accordance with the requirements of the light show, wherein the data associated with the light show is provided to the light controller, and wherein the light controller is configured to transmit the data associated with the light show to the GCS for allowing the GCS to accordingly control the flight of the UAVs and the discharge of the screening medium from the screening medium reservoir for obtaining a three-dimensional screen for receiving light projections from the at least one light source thereon to display the light show.

In an alternative embodiment, the GCS facilitates the discharge of the screening medium from the screening medium container in synchrony with the light show, wherein the synchrony is facilitated via timestamps and geoposition tracking of the plurality of UAVs via the GCS.

In an alternative embodiment, the screening medium reservoir is configured to store a screening medium therein, wherein the screening medium is pressurized water.

In an alternative embodiment, the screening medium reservoir includes an aerosol ejector for ejecting the screening medium from the screening medium reservoir in the form of aerosol for providing a three-dimensional screen for receiving a light projection thereon for displaying the light show, wherein the aerosol ejector is controlled via a relay for facilitating discharge in discrete manner.

In an alternative embodiment, a first set of UAVs from the plurality of UAVs form a periphery of the three-dimensional screen.

In an alternative embodiment, the screening medium reservoir attached to the first set of UAVs are configured to spray the screening medium in one direction toward an interior of said periphery.

In an alternative embodiment, a second set of UAVs from the plurality of UAVs are configured to be placed in an interior of the three-dimensional screen, and wherein the screening medium reservoir attached to the second set of UAVs are configured to spray the screening medium in multiple directions outwardly.

In an alternative embodiment, the screening medium reservoir is affixed to a UAV body of the plurality of UAVs at an operative bottom surface thereof substantially centrally.

In an alternative embodiment, the light controller provides a light feed to the at least one light source synchronously with the at least one flight program for projection onto the three-dimensional screen.

In an alternative embodiment, at least one light source is a laser light source.

The present disclosure also envisages a method for displaying a light show. The method comprises providing a plurality of Unmanned Aerial Vehicles (UAVs) having a screening medium reservoir attached thereto; establishing communication between a Ground Control Station (GCS) and the plurality of UAVs, wherein the GCS is configured to control a flight of the plurality of UAVs in accordance with at least one flight program and discharge of a screening medium from the screening medium reservoir; and establishing communication between a light controller and the GCS. In an embodiment, the light controller is configured for controlling at least one light source in accordance with requirements of the light show, wherein the data associated with the light show is provided to the light controller, and wherein the light controller is configured for transmitting the data associated with the light show to the GCS for allowing the GCS to accordingly control the flight of the UAVs and the discharge of the screening medium from the screening medium reservoir for obtaining a three-dimensional screen for receiving light projections from the at least one light source thereon to display the light show.

In an alternative embodiment, the method further comprises facilitating via the GCS, discharge of the screening medium from the screening medium container in synchrony with the light show, wherein the synchrony is facilitated via timestamps and geoposition tracking of the plurality of UAVs via the GCS.

In an alternative embodiment, the screening medium reservoir is configured to store a screening medium therein, wherein the screening medium is pressurized water.

In an alternative embodiment, the screening medium reservoir includes an aerosol ejector for ejecting the screening medium from the screening medium reservoir in the form of aerosol for providing a three-dimensional screen for receiving a light projection thereon for displaying the light show, wherein the aerosol ejector is controlled via a relay for facilitating discharge in discrete manner.

In an alternative embodiment, a first set of UAVs from the plurality of UAVs form a periphery of the three-dimensional screen.

In an alternative embodiment, the screening medium reservoir attached to the first set of UAVs are configured to spray the screening medium in one direction toward an interior of said periphery.

In an alternative embodiment, a second set of UAVs from the plurality of UAVs are configured to be placed in an interior of the three-dimensional screen, and wherein the screening medium reservoir attached to the second set of UAVs are configured to spray the screening medium in multiple directions outwardly.

In an alternative embodiment, the method further comprises providing, by a light controller, a light feed to the at least one light source synchronously with the at least one flight program for projection onto the three-dimensional screen.

In an alternative embodiment, at least one light source is a laser light source.

DESCRIPTION OF THE DRAWINGS

FIG. 2 shows another block diagram depicting the interaction between a ground control station and a UAV used in the system for displaying the light show, in accordance with an embodiment of the present disclosure.

DETAILED DESCRIPTION

Figure 1:
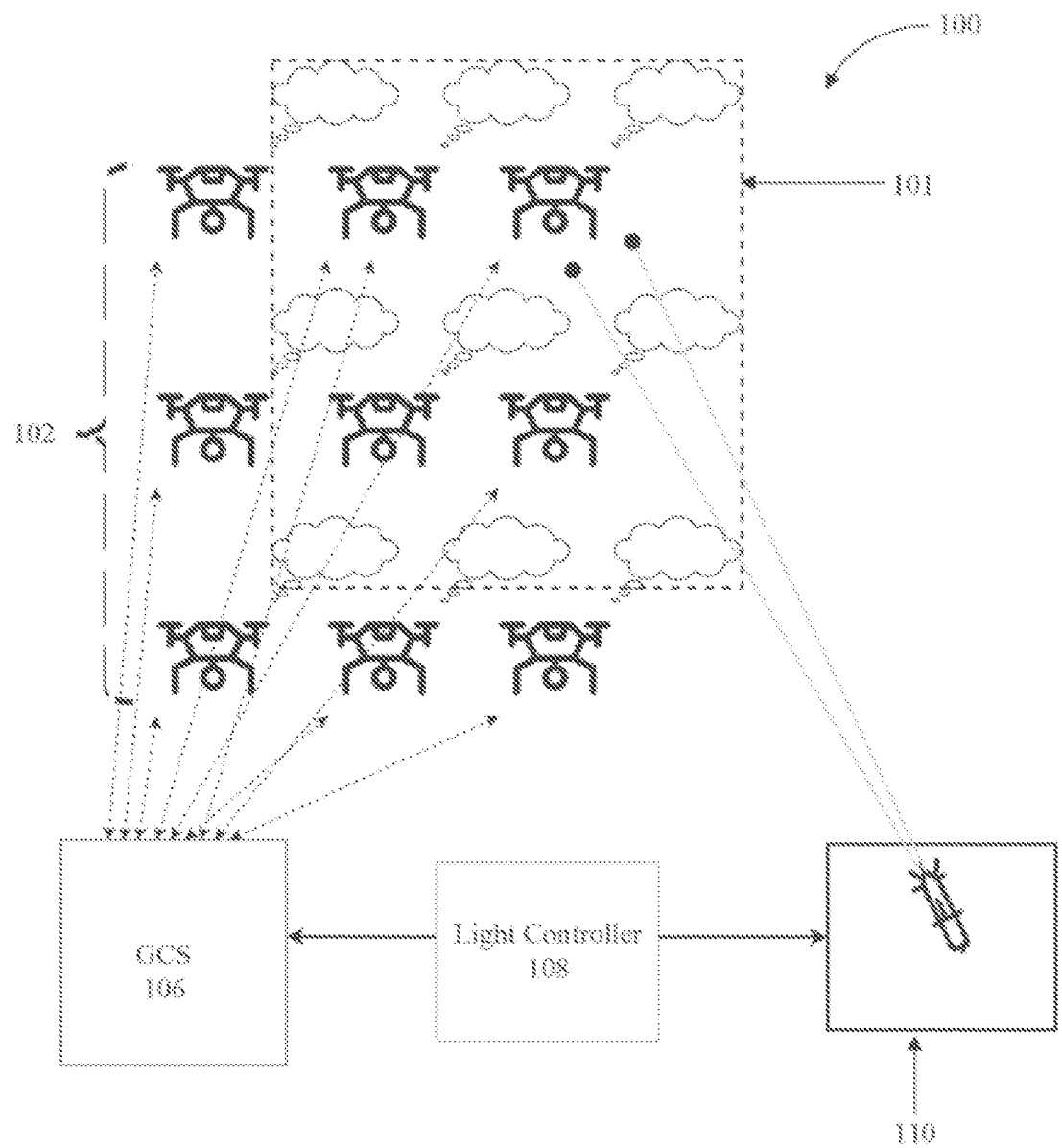
FIG. 1 shows a block diagram depicting a system for displaying a light show, in accordance with an embodiment of the present disclosure.

FIG. 1 shows a block diagram depicting a system for displaying a light show (hereinafter referred to as system 100), in accordance with an embodiment of the present disclosure. The system 100, in accordance with an embodiment of the present subject matter, comprises a plurality of Unmanned Aerial Vehicles (UAVs) 102 having a screening medium reservoir 104 (seen in FIGS. 2 and 3) attached thereto. In accordance with the present invention, it is envisaged a three-dimensional screen 101 formed using a screening medium is used for receiving light projection thereon to conduct the light show. Furthermore, the present subject matter envisages the usage of a screening medium that is not influenced by the weather conditions too much, while at the same time it can be easily ejected from the screening medium reservoir 104 as per the needs and requirements of the light show. To this end, one example of the screening medium is water that is stored under pressure within the screening medium reservoir 104. In accordance with one embodiment, the screening medium reservoir 104 includes an aerosol ejector 104A for ejecting the screening medium from the screening medium reservoir 104 in the form of an aerosol or atomized form for providing the three-dimensional screen 101 for receiving the light projection thereon for displaying the light show. In one embodiment, the aerosol ejector 104A is controlled via a relay for facilitating discharge in a discrete manner.

The system 100 further comprises a Ground Control Station (GCS) 106. The GCS 106 is communicatively coupled to the plurality of UAVs 102. In an embodiment, the communication between the GCS 106 and the plurality of UAVs 102 facilitates transmission of one or more commands, and the at least one flight program from the GCS to the plurality of UAVs, and the download of at least one parameter associated with the plurality UAVs at the GCS. In an embodiment, the GCS 106 is configured to control the plurality of UAVs in accordance with at least one flight program. More specifically, the GCS 106 can be configured to control the positioning of the UAVs 102 and the actuation of the aerosol ejector 104A of the screening medium reservoir 104 for obtaining the desired shape and size of the three-dimensional screen 101. The shape and size of the three-dimensional screen 101 is created in accordance with the requirement of the light show.

The system 100 further comprises a light controller 108. The light controller 108 is communicatively coupled to the GCS 106 and is configured to control at least one light source 110 in accordance with the light show requirements. In one embodiment, the data associated with the light show is provided to the light controller unit 110. In one embodiment, the data associated with the light show is transmitted from the light controller unit 110 to the GCS 106, wherein the GCS 106 controls the operation of the UAVs accordingly. More specifically, the GCS 106 controls the UAV flight in accordance with the shape and size of the required three-dimensional screen 101, after which the GCS 106 also controls the actuation of the aerosol ejector 104A either once or multiple times depending upon the size and contrast requirements of the light show. In one embodiment, the light controller 108 is configured to provide a light feed to at least one light source 110 in synchrony with the selected flight program. In one embodiment, the synchrony is facilitated via timestamps and geoposition tracking of the plurality of UAVs via the GCS 106. More specifically, the timestamps and geoposition tracking allow the GCS 106 to control the repositioning of the UAVs and spraying of the screening medium, in accordance with the requirement of the light show that is provided to the GCS 106 via the light controller 108.

Figure 2:
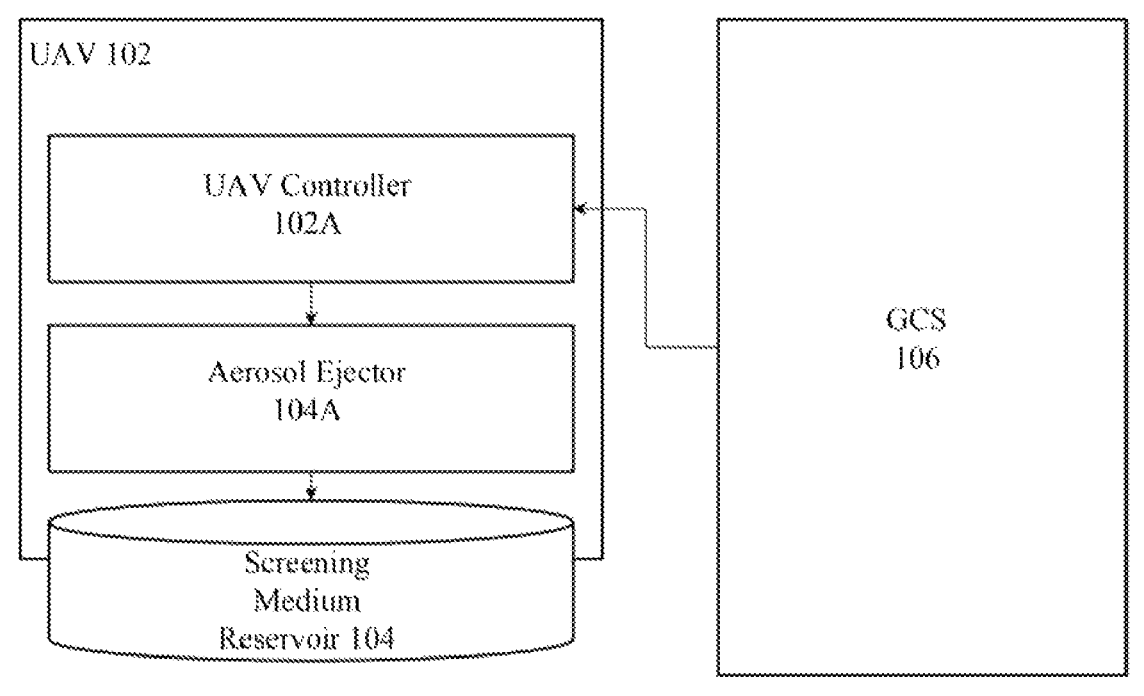

FIG. 2 shows another block diagram depicting the interaction between the ground control station 106 and a UAV 102 used in the system 100. As seen in FIG. 2, the GCS 106 is communicatively coupled to a UAV controller 102A of the UAV 102. The GCS 106 transmits the activation signals to the UAV controller 102A, in accordance with an embodiment of the present subject matter, for actuating the aerosol ejector 104A of the screening medium reservoir 104 for facilitating a discharge of the screening medium from the screening medium reservoir 104 in atomized or aerosol form. In one embodiment, the aerosol ejector 104A is controlled via a relay for facilitating discharge in discrete manner. In one embodiment, the GCS 106 can also send repositioning commands to the UAV 102, wherein the repositioning of the UAVs 102 is governed by the requirements of three-dimensional screen 101.

Figure 3:
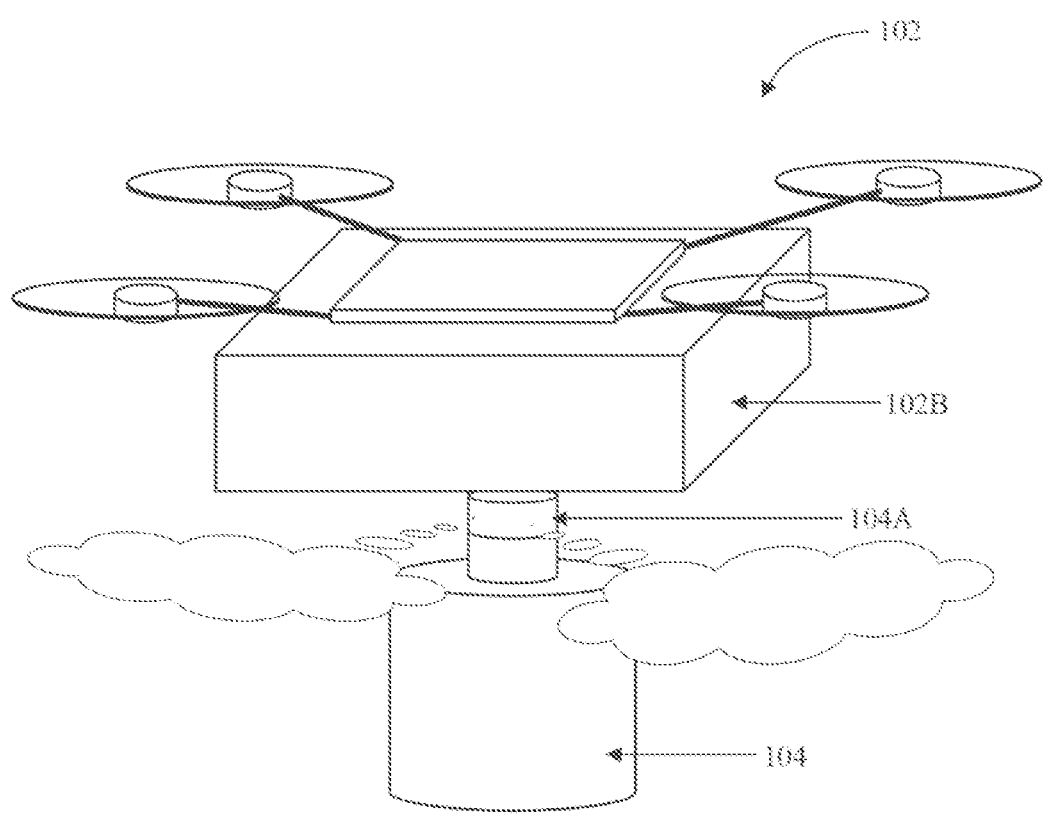
FIG. 3 shows a schematic diagram of a UAV with a screening medium reservoir attached thereto, in accordance with an embodiment of the present disclosure.

FIG. 3 shows a schematic diagram of a UAV 102 with the screening medium reservoir 104 attached thereto, in accordance with an embodiment of the present disclosure. As seen in FIG. 3, the screening medium reservoir 104 is affixed to a UAV body 102B of the plurality of UAVs 102 at an operative bottom surface thereof substantially centrally. Such an attachment of the screening medium reservoir 104 to the UAV 102 ensures a more stable flight for the UAV. More specifically, the cylindrical shape of the screening medium reservoir 104 reduces the axial drift when the UAV maneuvers.

In an embodiment, a first set of UAVs from the plurality of UAVs 102 form a periphery of the three-dimensional screen 101. The screening medium reservoir 104 attached to the first set of UAVs is configured to spray the screening medium in one direction toward an interior of said periphery. For example, if the required shape of the three-dimensional screen 101 is a sphere, then all the UAVs 102 that form the periphery of the spherical three-dimensional screen 101 have screening medium reservoirs 104 that are configured to spray the screening medium only in one direction towards the interior of the spherical three-dimensional screen 101. In an embodiment, a second set of UAVs from the plurality of UAVs 102 is configured to be placed in an interior of the three-dimensional screen 101, and wherein the screening medium reservoir attached to the second set of UAVs is configured to spray the screening medium in multiple directions outwardly. More specifically, in the above example of the spherical three-dimensional screen 101, the UAVs that are in the interior of the spherical three-dimensional screen 101 is configured to spray the screening medium in multiple directions to ensure the formation of a complete break-free spherical three-dimensional screen 101.

It is to be noted that the use of aerosol ejector 104A facilitates the reduction of the consumption of water balloons exponentially, which directly prolongs the continuous maintenance of the three-dimensional screen 101 for the light show. The period and duration of spraying is adjusted considering external factors, such as air temperature, wind speed, humidity, time of day. More frequent and longer activation of the aerosol ejector 104A can give a more contrast and clear image on the created three-dimensional screen 101.

In one implementation, during the light show, the three-dimensional screen 101 can change its shape and take the form of a cube, a sphere, a cloud, a given arbitrary surface, or a combination thereof. Changing the shape of the screen is performed in accordance with the selected flight program for the UAVs, which move in space to form the desired shape of the three-dimensional screen 101. In yet another implementation, the figure can be dynamic, i.e., the three-dimensional screen 101 onto which the light feed is projected is movable.

In accordance with one implementation, the flight of the UAVs 102 and the spraying of the screening medium from the screening medium reservoir 104 for forming the three-dimensional screen 101 is either synchronized or independently performed. For example, as the UAVs 102 moves, the frequency or duration of the spraying can be increased to ensure that the airborne density remains constant during the UAV movement.

Figure 4:
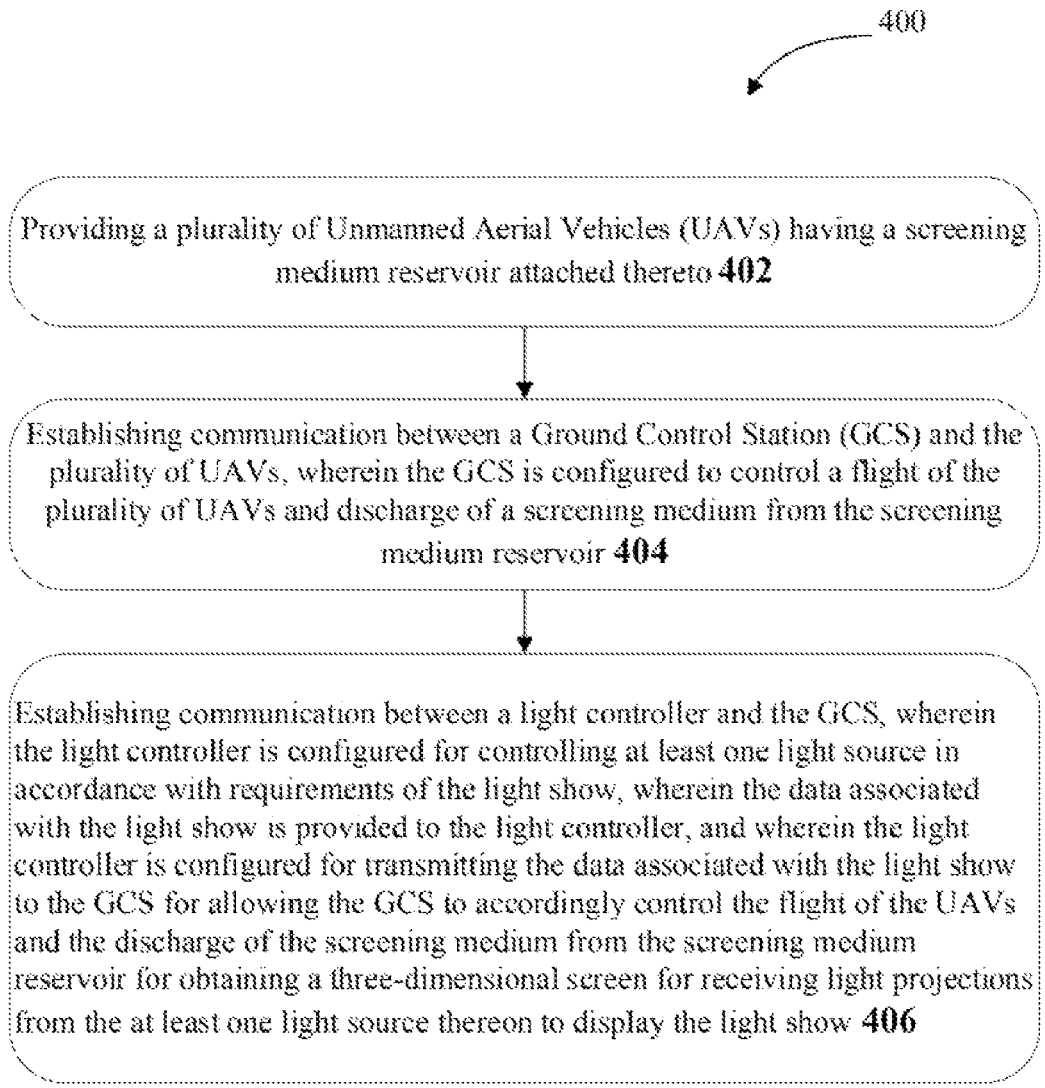
FIG. 4 shows a block diagram depicting a method for displaying a light show, in accordance with an embodiment of the present disclosure.

FIG. 4 shows a block diagram depicting a method for displaying a light show (hereinafter referred to as method 400), in accordance with an embodiment of the present disclosure. The order in which the method 400 is described is not intended to be construed as a limitation, and any number of the described method blocks can be combined in any order to implement the method or any alternative methods. Additionally, individual blocks can be deleted from the method without departing from the spirit and scope of the subject matter described herein. Furthermore, the method can be implemented in any suitable hardware, software, firmware, or combination thereof.

At block 402, the method 400 comprises the step of providing a plurality of Unmanned Aerial Vehicles (UAVs) 102 having a screening medium reservoir 104 attached thereto. The screening medium reservoir 104, in accordance with one implementation, contains pressurized water for usage as screening medium. One advantageous aspect of using the screening medium reservoir 104 is that it allows the maintenance of the three-dimensional screen 101 in real time for prolonging the light show.

At block 404, the method 400 comprises the step of establishing communication between a Ground Control Station (GCS) and the plurality of UAVs, wherein the GCS is configured to control a flight of the plurality of UAVs in accordance with at least one flight program and discharge of a screening medium from the screening medium reservoir. The communication between the GCS 106 and the UAVs 102 allows the GCS to transmit repositioning commands and control the way the screening medium is being discharged from the screening medium reservoir. More specifically, the manner of discharge herein refers to controlling the number of times an aerosol ejector 104A of the screening medium reservoir 104 is activated (discrete or impulse mode), wherein it generally depends upon the contrast requirements of the light show. At block 406, the method 400 includes the step of establishing communication between a light controller 108 and the GCS 106, wherein the light controller 108 is configured for controlling at least one light source in accordance with requirements of the light show, wherein the data associated with the light show is provided to the light controller 108, and wherein the light controller 108 is configured for transmitting the data associated with the light show to the GCS 106 for allowing the GCS 106 to accordingly control the flight of the UAVs 102 and the discharge of the screening medium from the screening medium reservoir 104 for obtaining a three-dimensional screen for receiving light projections from the at least one light source thereon to display the light show.

In one embodiment, the light controller 108 is configured to control the brightness of the light source 110 as per the requirements of the light show. In one scenario, when more contrast is required during the light show, the GCS 106 increases the discharge of the screening medium and the light controller 108 increases the brightness of the light source 110, and such a step is performed in a synchronized manner. In one embodiment, such a synchronized operation is facilitated by timestamps provided to synchronize the flight program, discharge of the screening medium, adjusting the brightness of the light source 110 via the light controller, and geoposition tracking of the UAVs 102.

The system and method for displaying a light show, in accordance with an embodiment of the present subject matter, has many advantageous aspects. One advantageous aspect of the system and method of the present disclosure is the provision of a three-dimensional dynamic screen that can be repositioned and maintained in real time using the plurality of UAVs 102 and the screening medium reservoirs 104. Furthermore, the contrast of the light show can also be controlled in real time by spraying more of the screening medium for making a denser three-dimensional screen 101. Yet another advantageous aspect is that the UAVs 102 can be seamlessly replaced by the GCS 106 if at all it is observed that any of the health parameters of one or more UAVs is not in the desired range, thereby ensuring seamless and break-free light show.

The invention claimed is:

1. A system for displaying a light show, the system comprising:
 a plurality of Unmanned Aerial Vehicles (UAVs) having a screening medium reservoir attached thereto;
 a Ground Control Station (GCS) communicatively coupled to the plurality of UAVs, wherein the GCS is configured to control a flight of the plurality of UAVs in accordance with a flight program and discharge of a screening medium from the screening medium reservoir; and a light controller discrete from and communicatively coupled to the GCS and configured to control at least one light source in accordance with requirements of the light show, the at least one light source external to the plurality of UAVs, wherein data associated with the light show is provided to the light controller, and wherein the light controller is configured to transmit the data associated with the light show to the GCS for allowing the GCS to accordingly control the flight of the UAVs and the discharge of the screening medium from the screening medium reservoir for obtaining a three-dimensional screen for receiving light projections from the at least one light source thereon to display the light show, wherein the GCS and the light controller are synchronized to ensure coordinated operation of the UAVs and the at least one light source in accordance with the light show, and wherein the data associated with the light show is transmitted from the light controller unit to the GCS, allowing the GCS to control the operation of the UAVs and the discharge of the screening medium from the screening medium reservoir in accordance with the transmitted data associated with the light show based on at least one common timestamp between at least one flight program for the UAVs and the data associated with the light show.

2. The system of claim 1, wherein the GCS facilitates the discharge of the screening medium from the screening medium container in synchrony with the light show, wherein the synchrony is facilitated via geoposition tracking of the plurality of UAVs via the GCS.

3. The system of claim 1, wherein the screening medium reservoir is configured to store a screening medium therein, wherein the screening medium is pressurized water.

4. The system of claim 3, wherein the screening medium reservoir includes an aerosol ejector for ejecting the screening medium from the screening medium reservoir in a form of aerosol for providing a three-dimensional screen for receiving a light projection thereon for displaying the light show, wherein the aerosol ejector is controlled via a relay for facilitating discharge in discrete manner.

5. The system of claim 4, wherein a first set of UAVs from the plurality of UAVs form a periphery of the three-dimensional screen.

6. The system of claim 5, wherein the screening medium reservoir attached to the first set of UAVs are configured to spray the screening medium in one direction toward an interior of said periphery.

7. The system of claim 6, wherein a second set of UAVs from the plurality of UAVs are configured to be placed in an interior of the three-dimensional screen, and wherein the screening medium reservoir attached to the second set of UAVs are configured to spray the screening medium in multiple directions outwardly.

8. The system of claim 1, wherein the screening medium reservoir is affixed to a UAV body of the plurality of UAVs at an operative bottom surface thereof substantially centrally.

9. The system of claim 7, wherein the light controller provides a light feed to the at least one light source synchronously with the at least one flight program for projection onto the three-dimensional screen.

10. The system of claim 9, wherein at least one light source is a laser light source.

11. The system of claim 1, wherein the light controller is further configured to control a brightness of the at least one light source according to at least one requirement of the light show.

12. The system of claim 1, wherein the screening medium reservoir is positioned distally from a body of the UAV, and where the discharge of the screening medium is between the screening medium reservoir and the body of the UAV.

13. A method for displaying a light show, the method comprising:

providing a plurality of Unmanned Aerial Vehicles (UAVs) having a screening medium reservoir attached thereto;

establishing communication between a Ground Control Station (GCS) and the plurality of UAVs, wherein the GCS is configured to control a flight of the plurality of UAVs and discharge of a screening medium from the screening medium reservoir; and establishing communication between a light controller discrete from the GCS and the GCS, wherein the light controller is configured for:

controlling at least one light source in accordance with requirements of the light show, the at least one light source external to the plurality of UAVs, wherein data associated with the light show is provided to the light controller, and wherein the light controller is configured for transmitting the data associated with the light show to the GCS for allowing the GCS to accordingly control the flight of the UAVs and the discharge of the screening medium from the screening medium reservoir for obtaining a three-dimensional screen for receiving light projections from the at least one light source thereon to display the light show, wherein the GCS and the light controller are synchronized to ensure coordinated operation of the UAVs and the at least one light source in accordance with the light show, and wherein the GCS and the light controller are synchronized to ensure coordinated operation of the UAVs and the at least one light source in accordance with the light show, and wherein the data associated with the light show is transmitted from the light controller unit to the GCS, allowing the GCS to control the operation of the UAVs and the discharge of the screening medium from the screening medium reservoir in accordance with the transmitted data associated with the light show based on at least one common timestamp between at least one flight program for the UAVs and the data associated with the light show.

14. The method of claim 13, further comprising, facilitating via the GCS, discharge of the screening medium from the screening medium container in synchrony with the light show, wherein the synchrony is facilitated via geoposition tracking of the plurality of UAVs via the GCS.

15. The method of claim 13, wherein the screening medium reservoir is configured to store a screening medium therein, wherein the screening medium is pressurized water.

16. The method of claim 15, wherein the screening medium reservoir includes an aerosol ejector for ejecting the screening medium from the screening medium reservoir in a form of aerosol for providing a three-dimensional screen for receiving a light projection thereon for displaying the light show, wherein the aerosol ejector is controlled via a relay for facilitating discharge in discrete manner.

17. The method of claim 16, wherein a first set of UAVs from the plurality of UAVs form a periphery of the three-dimensional screen.

18. The method of claim 17, wherein the screening medium reservoir attached to the first set of UAVs are configured to spray the screening medium in one direction toward an interior of said periphery.

19. The method of claim 18, wherein a second set of UAVs from the plurality of UAVs are configured to be placed in an interior of the three-dimensional screen, and wherein the screening medium reservoir attached to the second set of UAVs are configured to spray the screening medium in multiple directions outwardly.

20. The method of claim 19, further comprising providing, by a light controller, a light feed to the at least one light source synchronously with the at least one flight program for projection onto the three-dimensional screen.

* * * * *